United States Patent [19]
Yonan

[11] 3,761,484
[45] Sept. 25, 1973

[54] 4-PHENYL-1-PIPERIDINEALKANONITRILES

[75] Inventor: Peter K. Yonan, Morton Grove, Ill.

[73] Assignee: G. D. Searle & Co., Chicago, Ill.

[22] Filed: Dec. 23, 1971

[21] Appl. No.: 211,684

[52] U.S. Cl. ............................. 260/293.75, 424/267
[51] Int. Cl. ............................................. C07d 29/32
[58] Field of Search ................................. 260/293.75

[56] References Cited
OTHER PUBLICATIONS

Il Farmaco Ed. Sc. 25: 926, 936, 937 (1970) –De Meglio

Primary Examiner—Henry R. Jiles
Assistant Examiner—S. D. Winters
Attorney—John M. Brown et al.

[57] ABSTRACT

4-Phenyl-1-piperidinealkanonitriles are described herein. They are prepared from 4-phenylpiperidine and an appropriate haloalkanonitrile. These compounds are useful as anti-depressants.

3 Claims, No Drawings

4-PHENYL-1-PIPERIDINEALKANONITRILES

The present invention relates to 4-phenyl-1-piperidinealkanonitriles and more particularly to compounds having the following general formula

whein Alk is a lower alkylene group containing up to 6 carbon atoms. The free valences in these lower alkylene groups can be on the same or different carbon atoms. Examples of lower alkylene groups are methylene, ethylene, ethylidene, propylene and trimethylene. The lower alkylene groups can be further optionally substituted with an aromatic group such as phenyl or substituted phenyl.

The compounds of the present invention are prepared by the reaction of 4-phenylpiperidine with an appropriate haloalkanonitrile. A chloroalkanonitrile is particularly useful for this purpose although bromoalkanonitriles are also quite suitable. The reaction is conveniently carried out at reflux in an inert solvent such as 2-butanone preferably in the presence of an inorganic base such as potassium carbonate.

In the case where Alk is ethylene, it is possible to obtain this compound by the reaction of 4-phenylpiperidine with acrylonitrile.

The organic bases of this invention form pharmaceutically acceptable salts with a variety of inorganic and strong organic acids. Such salts are formed with acids such as sulfuric, phosphoric, hydrochloric, hydrobromic, hydriodic, sulfamic, citric, lactic, maleic, malic, succinnic, tartaric, cinnamic, acetic, benzoic, gluconic, ascorbic, and related acids.

The compounds of the present invention are useful because of their pharmacological properties. In particular, the present compounds are useful as anti-depressants. The anti-depressant utility is demonstrated in mice by a standard procedure. Thus, mice weighing 20–30 grams are first administered the test compound intragastrically in groups of five and then, 1 hour later, there is administered intraperitoneally 20 mg./kg. of 2-hydroxy-2-ethyl-3-isobutyl-9,10-dimethoxy-1,2,3,4,6,7-hexahydro-11bH-benzo[a]quinolizine, a synthetic compound with reserpine-like activity. The indicated dose of the reserpine-like compound produces essentially complete ptosis in the animals ½ hour after administration. A compound is rated active if it antagonizes this ptosis. 4-Phenyl-1-piperidineacetonitrile (hydrochloride) was active in this test at a dose of 25 mg./kg.

The following examples are presented to further illustrate the present invention; they should not be construed as limiting it in spirit or in scope. In these examples, quantities are indicated in parts by weight and temperatures in degrees centigrade (° C.).

EXAMPLE 1

A mixture of 25 parts of 4-phenylpiperidine and 25 parts of potassium carbonate in 240 parts of 2-butanone is heated to reflux. Then, 13 parts of 2-chloroacetonitrile in 40 parts of 2-butanone is added portionwise at reflux over a period of 30 minutes. Refluxing is continued for an additional 3 hours. The hot mixture is filtered to remove the salts and the solvent is evaporated from the filtrate to leave a residual solid. Recrystallization of this material from 2-propanol gives 4-phenyl-1-piperidineacetonitrile melting at about 100°–101° C.

To obtain the hydrochloride salt, the free base is dissolved in ethanol and there is added an excess of a saturated solution of hydrogen chloride in 2-propanol. Ether is then added to give a crystalline solid. This is separated by filtration to give 4-phenyl-1-piperidineacetonitrile hydrochloride melting at about 178°–182° C. with decomposition. The free base of this compound has the following formula

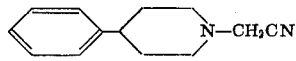

What is claimed is:
1. A compound selected from the group consisting of 4-phenyl-1-piperidineacetonitrile and the acid addition salts thereof.
2. A compound according to claim 1 which is 4-phenyl-1-piperidineacetonitrile.
3. A compound according to claim 1 which is 4-phenyl-1-piperidineacetonitrile hydrochloride.

* * * * *